US012682219B2

(12) United States Patent
Pauletto et al.

(10) Patent No.: US 12,682,219 B2
(45) Date of Patent: Jul. 14, 2026

(54) METHOD, COMPUTER PROGRAM AND DEVICE FOR TRAINING A DYNAMIC-ARCHITECTURE CONVOLUTIONAL NEURAL NETWORK FOR SEMANTIC IMAGE SEGMENTATION

(71) Applicants: BULL SAS, Les Clayes-sous-Bois (FR); UNIVERSITE GRENOBLE ALPES, Saint Martin d'Heres (FR); INSTITUT POLYTECHNIQUE DE GRENOBLE, Grenoble (FR); CENTRE NATIONAL DE LA RECHERCHE SCIENTIFIQUE, Paris (FR)

(72) Inventors: Loïc Pauletto, Grenoble (FR); Massih-Reza Amini, La Terrasse (FR)

(73) Assignees: BULL SAS, Les Clayes-sous-Bois (FR); UNIVERSITE GRENOBLE ALPES, Saint Martin d'Heres (FR); INSTITUT POLYTECHNIQUE DE GRENOBLE, Grenoble (FR); CENTRE NATIONAL DE LA RECHERCHE SCIENTIFQUE, Paris (FR)

( * ) Notice: Subject to any disclaimer, the term of this patent is extended or adjusted under 35 U.S.C. 154(b) by 626 days.

(21) Appl. No.: 18/181,022

(22) Filed: Mar. 9, 2023

(65) Prior Publication Data
US 2023/0289571 A1    Sep. 14, 2023

(30) Foreign Application Priority Data

Mar. 10, 2022    (EP) .................................... 22305268

(51) Int. Cl.
*G06N 3/0464*    (2023.01)
*G06N 3/0895*    (2023.01)
*G06N 3/09*    (2023.01)

(52) U.S. Cl.
CPC ......... *G06N 3/0464* (2023.01); *G06N 3/0895* (2023.01); *G06N 3/09* (2023.01)

(58) Field of Classification Search
CPC ...... G06N 3/0464; G06N 3/0895; G06N 3/09; G06N 3/082; G06N 3/084; G06N 3/088; G06V 10/774; G06V 10/82; G06V 20/70
See application file for complete search history.

(56) References Cited

U.S. PATENT DOCUMENTS

2021/0216828 A1*    7/2021    Ramaiah ................ G06N 3/045

OTHER PUBLICATIONS

Learning Dynamic Routing, Li et al 2020 (Year: 2020).*
(Continued)

*Primary Examiner* — Jianxun Yang
(74) *Attorney, Agent, or Firm* — ARC IP Law, PC; Joseph J. Mayo

(57) ABSTRACT

The invention relates to a method for training a dynamic-architecture convolutional neural network for semantic image segmentation, including auto-annotation of images, to constitute a first image database of auto-annotated images. The method includes applying at least one transformation to at least one source image, and adding, to each transformed image thus obtained, a first tag corresponding to the transformation. The method also includes at least one iteration of a phase including training the neural network with the first image database, and a second image database annotated with a second tag relating to the content of the image. The invention also relates to a computer program and a device implementing the method, and a deep-learning dynamic-architecture convolutional neural network obtained by the method.

15 Claims, 3 Drawing Sheets

(56)          References Cited

OTHER PUBLICATIONS

Unsupervised Representation Learning, Gidaris et al 2018 (Year: 2018).*
European Search Report and Written Opinion issued in EP22305268 dated Aug. 30, 2022 (11 pages).
Pauletto, et al., "Self Semi Supervised Neural Architecture Search for Semantic Segmentation", ARXIV.org, Feb. 1, 2022.
Yanwei, et al., "Learning Dynamic Routing for Semantic Segmentation", 2020 IEEE/CVF Conference on Computer Vision and Pattern Recognition, Jun. 13, 2020.

* cited by examiner

1

METHOD, COMPUTER PROGRAM AND DEVICE FOR TRAINING A DYNAMIC-ARCHITECTURE CONVOLUTIONAL NEURAL NETWORK FOR SEMANTIC IMAGE SEGMENTATION

This application claims priority to European Patent Application Number 22305268.9, filed 10 Mar. 2022, the specification of which is hereby incorporated herein by reference.

BACKGROUND OF THE INVENTION

Field of the Invention

At least one embodiment of the invention relates to a method for training a deep-learning dynamic architecture convolutional neural network for semantic image segmentation. At least one embodiment also relates to a computer program and a device implementing such a method, and a deep-learning dynamic-architecture convolutional neural network obtained by such a method.

The field of the invention is generally the field of training deep-learning dynamic-architecture convolutional neural networks for semantic image segmentation.

Description of the Related Art

In many fields, such as surveillance, it is very useful to perform semantic segmentation of an image, that is to say to extract a mask making it possible to accurately identify and cut out each element of an image. Semantic image segmentation can be performed in an automated manner by a deep-learning convolutional neural network (CNN). The mask indicates to which object class each pixel of the image belongs.

There are CNN systems with a fixed architecture for semantic image segmentation. However, these networks consume execution resources and are limited in performance when the input data is changing in nature. To overcome these drawbacks, dynamic-architecture neural networks have been developed, such as that described by Yanwei Li et al. in the document "Learning Dynamic Routing for Semantic Segmentation", available at https://arxiv.org/pdf/2003.10401.pdf.

In a dynamic-architecture CNN, the routing of the data within the network is dynamic and changes as a function of the input image. Thus, the CNN adapts to the images given as input in order to achieve better performance of semantic segmentation while requiring less execution resources.

However, training a dynamic-architecture convolutional neural network must be performed in a supervised manner, which is time-consuming and uses up resources, and in particular images annotated for training.

One aim of at least one embodiment of the invention is to solve at least one of the drawbacks of the state of the art.

Another aim of the one or more embodiments of the invention is to propose a solution for training a less time-consuming dynamic-architecture convolutional neural network.

It is also an aim of at least one embodiment of the invention to propose a solution for training a dynamic-architecture convolutional neural network using fewer resources, and in particular images annotated for training.

BRIEF SUMMARY OF THE INVENTION

At least one embodiment of the invention proposes to achieve at least one of the aforementioned aims by a method for training a dynamic-architecture convolutional neural network for semantic image segmentation, said method comprising a phase of auto-annotation of images, to constitute a base, called the first database, of auto-annotated images, said auto-annotation phase comprising the following steps:

applying at least one transformation to at least one source image, and adding, to each transformed image thus obtained, a tag, called the first tag, corresponding to said transformation;

said method comprising at least one iteration of a training phase of said neural network comprising the following steps:

training, referred to as self-supervised training, of said neural network with the first image database, providing an error, referred to as a self-supervised learning error, supervised training of said neural network with a second database of images annotated with a tag, referred to as the second tag, relating to the content of said image, providing an error, referred to as the supervised learning error, and updating at least one parameter of said neural network as a function of the errors obtained.

The method according to one or more embodiments of the invention proposes a semi-supervised training to train a dynamic-architecture convolutional neural network for semantic image segmentation. In particular, at least one embodiment of the invention proposes to construct an auto-annotated image base in an automated, autonomous manner. This auto-annotated image base is then used, in addition to a previously annotated image base, to train the convolutional neural network. Thus, at least one embodiment of the invention makes it possible to reduce the number of previously annotated images needed to train the convolutional neural network. Consequently, at least one embodiment of the invention proposes a solution for training a dynamic-architecture convolutional neural network less time-consuming and using fewer resources, and in particular less images previously annotated for training. Since the trained convolutional neural network obtained by the method according to one or more embodiments of the invention has a dynamic architecture, it offers better performance of semantic segmentation while requiring less execution resources than a convolutional neural network with a fixed or static architecture.

In at least one embodiment, the first database is composed of auto-annotated images with a first tag. It should be noted that this first tag has no connection to the semantic content of the image, and in particular is not a segmentation mask. It indicates only the transformation applied to the image. Thus, the auto-annotation of each image during the auto-annotation phase is rapid, consumes few resources, and can be carried out in an automated manner without any intervention from an operator.

The second database is composed of images annotated by an operator with a second tag. In particular, this second tag is a semantic segmentation mask indicating for each pixel of the image the class of the object to which said pixel belongs. This second tag therefore relates to the content of the image. This second image database is created prior to the execution of the method according to the invention.

Dynamic-architecture convolutional neural network means a convolutional neural network comprising a plurality of layers and a plurality of convolution levels, and within which the data propagation path changes based on the input data. The data propagation path changes so that, for at least one neuron of at least one layer, the output of said neuron is directed selectively to different neurons of a next layer as a function of the input data of said neural network. In particular, a routing function, called "gate function", generates a probability of routing for each possible path between a neuron of a layer and the neurons of a subsequent layer. The probability data associated with each path is used to determine whether said path is open or not, that is, if said path must be used or not. Thus, the architecture of the neural network adapts to each given image as input of said neural network.

According to one or more embodiments, the self-supervised training steps and supervised training steps can be carried out in turn.

Thus, a self-supervised training step can be carried out using the images from the first database. To do this, each image from the first database is provided to the neural network and a prediction is obtained for each image from the first database. For each image, an individual self-supervised training error is calculated based on the first tag associated with said image and the output of the neural network for said image. The error can be a Euclidean or cosine distance between the first tag and the output of the neural network. Depending on the individual self-supervised training errors obtained for the images of the first database, a self-supervised training error is calculated for the first database as a whole. For example, the self-supervised training error may be equal to the average of the individual self-supervised training errors obtained for all images from the first database.

Next, a supervised training step can be carried out using the images from the second database. To do this, each image from the second database is provided to the neural network and a prediction is obtained for each image from the second database. For each image, an individual supervised training error is calculated based on the second tag associated with said image and the output of the network for said image. The error may be a cross-entropy between the second tag and the output of the convolutional neural network. Depending on the individual supervised training errors obtained for the images from the second database, a supervised training error is calculated for the second database as a whole. For example, the supervised training error may be equal to the average of the individual supervised training errors obtained for all images from the second database.

Of course, according to one or more embodiments, the training steps can be carried out at the same time, for example on two identical copies of the neural network.

According to one or more embodiments, the training phase can comprise a step of calculating an aggregate error based on the errors obtained during the self-supervised and supervised trainings.

In this case, the updating step can be carried out based on said aggregate error.

The aggregate error can be an average of the self-supervised training errors and supervised training errors.

According to one or more embodiments, the auto-annotation phase can apply several transformations to a source image so as to obtain a plurality of transformed images from said source image, each transformed image comprising a tag corresponding to the transformation.

For example, in at least one embodiment, the auto-annotation phase can apply, individually, four different transformations to a source image so as to obtain four transformed images from the same source image. In this case, the first tag associated with each transformed image can be a vector of four values indicating which of the transformations has been applied to the source image. For example, if the transformation applied to the source image is the second one of the transformations, the first tag associated with the image thus obtained can be (0;1;0;0). For a transformed image obtained by applying the third transformation, the first tag associated with the image thus obtained can be (0;0;1;0).

Thus, for a source image, as many transformed images as there are different transformations can be obtained.

According to one or more embodiments, at least one transformation applied to a source image can be a rotation of the image by a predetermined angle.

In this case, the first tag can alternatively indicate the value of the angle of rotation.

According to one or more embodiments, four different rotations of four angles can be applied to a source image, individually, to obtain four transformed images from the same source image. For example, the four angles can be: 0°, 90°, 180° and 270°. In this case, a transformed image obtained by applying a rotation of 180° can have as its first tag (180°) or (0;0;1;0).

Of course, in at least one embodiment, at least one transformation applied to a source image may be something other than a rotation. For example, at least one transformation applied to a source image may be distortion of at least one color of the image, image shearing, image blurring, image noising, etc.

According to one or more embodiments, at least one source image may be an image from the second image database. Thus, each transformed image obtained from said source image comprises:

the first tag added to said image during the auto-annotation phase; and the second tag of said source image.

Indeed, in this case, the source image being an image of the second database, it already has a second tag. This second tag is kept for the transformed image during the auto-annotation phase. The auto-annotation phase additionally adds a first tag to the transformed image. During the self-supervised learning step, only the first tag is used even if the image also comprises a second tag.

On the other hand, in at least one embodiment, the transformed image with its second tag can be used to enrich the second image database, optionally after adapting said second tag based on the transformation applied to the image. Thus, the auto-annotation phase makes it possible both to create the first database and to enrich the second database, which makes it possible to have more training images to be used during the supervised training step. In other words, the auto-annotation phase can produce an increase for the images of the second database while creating the first database.

According to one or more embodiments, for at least one annotated image from the second database, the second tag may be a segmentation mask.

Such a segmentation mask indicates, for each pixel of the image, the nature of the object, in particular the class of the object, to which said pixel belongs. Thus, such a segmentation mask indicates the position and nature of each image located on the image.

The updating step can perform an update of a routing, and in particular a routing coefficient, or a routing function, of the output of at least one neuron of a layer of the neural network.

It is this update of the routing which makes it possible to modify the architecture of the neural network as a function of the image provided at the input of the neural network.

More particularly, in at least one embodiment, the updating step can update at least one coefficient of a routing function, or "gate function", for at least one neuron of a layer of the neural network. Such a function is designed to generate a routing probability for each possible path at the output of said neuron, based on the input data that is supplied to it by one or several neurons of a previous layer of the neural network. The probability data associated with each path is used to determine whether said path is open or not, that is, if said path must be used or not, for a given image at the input of the neural network. Thus, the architecture of the neural network adapts to each given image as input of said neural network.

Alternatively, or in addition, by way of one or more embodiments, the updating step may perform an update of at least one activation coefficient of at least one neuron of the neural network.

More particularly, in at least one embodiment, the updating step can update at least one coefficient of an activation function, for at least one neuron of a layer. Such a function is designed to generate an activation value, based on the input data that is supplied to it by one or more neurons of a previous layer of the neural network. This activation data indicates whether the neuron must be active or not, that is if the neuron must process the data that is provided to it, or if it must remain transparent to the data and transmit them to at least one neuron of a subsequent layer.

Alternatively, or in addition, by way of at least one embodiment, the updating step may perform an update of at least one coefficient of a neuron of the neural network.

Such a coefficient, also called a weight, corresponds to the coefficient applied by said neuron to an item of data which is supplied to it by a neuron of a previous layer, in order to provide an item of output data.

Such a coefficient may be a coefficient of a processing function that the neuron must apply to the data that is provided to it.

The method according to one or more embodiments of the invention may further comprise a step of evaluating the performance of the neural network on a validation database comprising annotated images, in order to determine whether said neural network is sufficiently trained or not.

The validation database comprises validation images that are different from the second database.

The validation step can be carried out at each iteration of the training phase.

Alternatively, in at least one embodiment, the validation step can be carried out at a different frequency, for example every K iterations of the training phase.

The validation step can measure a performance metric and the training phase can be repeated as long as the performance metric has not reached a predetermined value, or a maximum, or still a level.

For example, it may be considered that the neural network is sufficiently trained when the performance metric has reached a maximum and has started to decrease. According to at least one embodiment, it may be considered that the neural network is sufficiently trained when the performance metric has reached a level and does not increase during a predetermined number, for example 5, iterations of the training phase.

According to at least one embodiment, the validation metric can be mIoU, for "mean Intersection over Union".

Indeed, the metric that is used to evaluate the performance of the neural network may be the mIoU metric. The mIoU corresponds to an average of the IoU, for "Intersection over Union", obtained for all the images of the validation database. The IoU for each image is calculated as follows:

$$IoU = ZI/ZU$$

where:
- ZI: intersection zone, that is the number of pixels in common, between the tag of the validation image and the tag estimated by the neural network; and
- ZU: union zone, that is the sum of the pixels, the tag of the validation image, and the tag estimated by the neural network;

with the understanding that the tag is a semantic segmentation mask. Next, the average over all of the classes is calculated to obtain the mIoU.

According to at least one embodiment of the invention, a computer program is proposed comprising executable instructions, which, when they are executed by a computer device, implement all the steps of the method according to the invention.

The computer program can be in any computer language, such as, for example, in machine language, in C, C++, JAVA, Python, etc.

According to at least one embodiment of the invention, a fish presence detection device at a maritime point is proposed, comprising means configured to implement all the steps of the method according to the invention.

The device according to one or more embodiments of the invention can be any type of apparatus such as a server, a computer, a tablet, a calculator, a processor, a computer chip, programmed to implement the method according to the invention, for example by running the computer program according to at least one embodiment of the invention.

BRIEF DESCRIPTION OF THE DRAWINGS

Other benefits and features shall become evident upon examining the detailed description of entirely non-limiting one or more embodiments, and from the enclosed drawings in which.

DETAILED DESCRIPTION OF THE INVENTION

It is clearly understood that the one or more embodiments that will be described hereafter are by no means limiting. In particular, it is possible to imagine variants of the invention that comprise only a selection of the features disclosed hereinafter in isolation from the other features disclosed, if this selection of features is sufficient to confer a technical benefit or to differentiate the one or more embodiments of the invention with respect to the prior art. This selection comprises at least one preferably functional feature which is free of structural details, or only has a portion of the structural details if this portion alone is sufficient to confer a technical benefit or to differentiate the one or more embodiments of the invention with respect to the prior art.

In particular, all of the described variants and embodiments can be combined with each other if there is no technical obstacle to this combination.

In the figures and in the remainder of the description, the same reference has been used for the features that are common to several figures.

Figure 1:
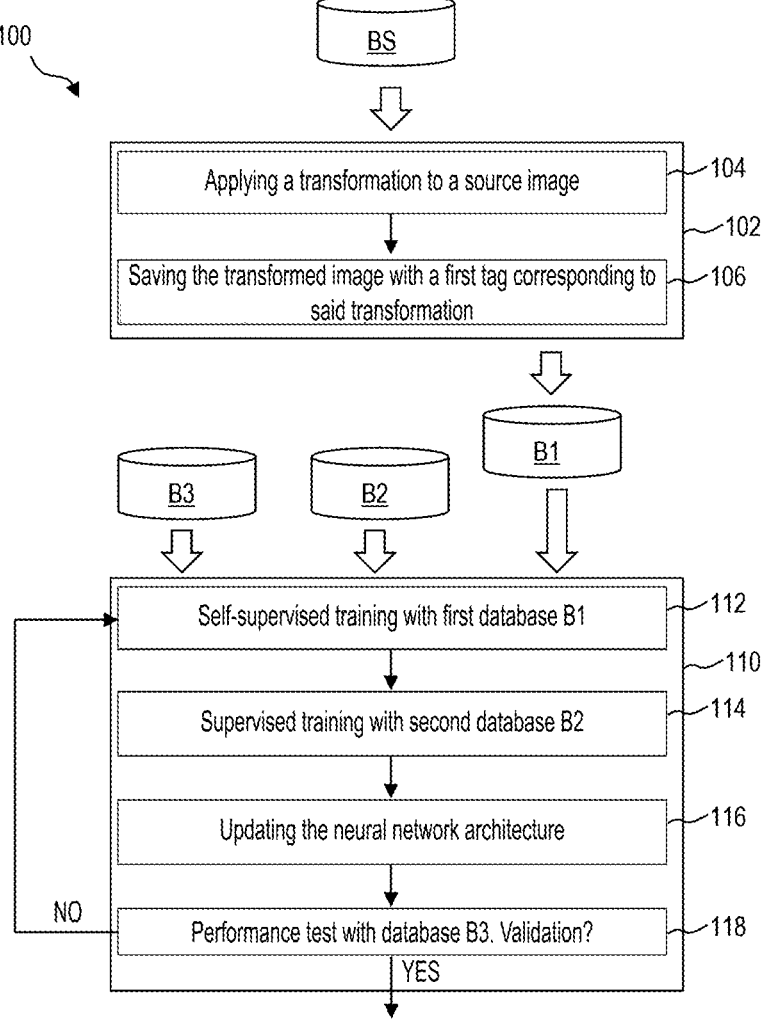
FIG. 1 is a schematic representation of a method according to one or more embodiments of the invention.

FIG. 1 is a schematic representation of a method according to one or more embodiments of the invention for training a learning convolutional neural network for the semantic segmentation of an image.

The method 100 of FIG. 1 can be used for semantic segmentation of all types of images.

The method 100 of FIG. 1 comprises a phase 102 of auto-annotation of images to constitute a database B1, referred to as the first database, of auto-annotated images, from a database BS, referred to as the source database, of images. This phase 102 is aimed at obtaining, entirely autonomously and without an operator's intervention, an annotated image database.

The image auto-annotation phase comprises a step 104 applying a transformation to an image of the source database BS. The transformed image, called the first image, is stored, during a step 106, in the first database B1 with a tag, called the first tag, corresponding to said transformation.

The transformation applied during step 104 may be chosen from a list of N transformation(s), where N≥1. Thus, the second tag can be a vector of dimension N indicating the transformation applied to the transformed image. For example, when N=4 and a first image is obtained by applying the third transformation, then the first tag associated with this first transformed image can be (0;0;1;0).

At least one, and in particular each, transformation may be a rotation of the image. For example, when N=4, then the first transformation can be a 0° rotation, the second transformation may be a 90° rotation, the third transformation may be a 180° rotation, and the fourth transformation may be a 270° rotation. Alternatively, in at least one embodiment, at least one transformation may be a distortion of at least one color of the image, a shear, a blurring, a noise, etc.

For each image of the source database BS, the steps 104 and 106 can be applied in turn for each transformation so as to obtain, from said image, as many first images as there are transformations. Thus, if the source database comprises M images and the transformation applied in step 104 is chosen from N transformations, then it is possible to obtain a first database of annotated images comprising N×M images.

The method 100 further comprises a phase 110 of training the convolutional neural network with:
 the first image database comprising first annotated images, each one with a first tag, which is created during the auto-annotation phase 102; and
 a second image database comprising second annotated images, each one with a second tag.
In particular, the second tag of each second image is a semantic segmentation mask.

In particular, the training phase 110 comprises a first training step performing a training, called self-supervised, during which the neural network is trained with the first database B1 constituted during phase 102. The self-supervised 112 training step 112 comprises the following steps:
 each image of the first database B1 is provided to the convolutional neural network to obtain a prediction for the first tag associated with said first image,
 for each first image, an individual self-supervised training error is calculated based on the first tag associated with said image and the prediction of the neural network for said first tag: the error may be a Euclidean or cosine distance between the first tag and the output of the neural network; and
 a self-supervised training error is calculated for all the images of the first database B1 based on the individual self-supervised learning errors obtained for each of the images of the first database B1. For example, the self-supervised training error may be equal to the average of the individual self-supervised training errors obtained for all images from the first database B1.

The training phase 110 comprises a training step 114 performing supervised training during which the neural network is trained with the second database B2. The supervised training step 114 comprises the following steps:
 each second image of the second database B2 is provided to the convolutional neural network to obtain a prediction for the second tag associated with said second image,
 for each second image, an individual supervised training error is calculated based on the second tag associated with said second image and the prediction of the neural network for said second tag: the error may be a cross-entropy between the second tag saved with the second image and the estimation of the second tag by the neural network; and
 a supervised training error is calculated for all the second images based on the individual supervised learning errors obtained for each of the second images of the second database. For example, the supervised training error may be equal to the average of the individual supervised training errors obtained for all second images from the second database.

The training phase 110 then comprises a step of calculating an aggregate error based on the self-supervised training error obtained in step 112 and the supervised training error obtained in step 114. For example, the aggregate error may be a sum of these errors.

During a step 116, the neural network architecture is updated.

In particular, the updating step carries out an updating of a routing coefficient, or of a routing function, of the output of at least one neuron of a layer. For example, the routing coefficient can be generated by one or more convolutions. The routing coefficient can be updated by updating these convolutions via the back-propagation of the error. This update makes it possible to modify the architecture of the neural network based on the image provided at the input of the neural network. More particularly, the updating step can update at least one coefficient of a routing function, or "gate function", for at least one neuron of a layer of the neural network. Such a function is designed to generate a routing probability for each possible path at the output of said neuron, based on the input data that is supplied to it by one or more neurons of a previous layer of the neural network. The probability data associated with each path is used to determine whether said path is open or not, that is, if said path must be used or not. Thus, the architecture of the neural network adapts to each given image as input of said neural network.

The updating step 116 may further perform an update
 of at least one activation coefficient of at least one neuron, and/or
 of at least one coefficient of a neuron of the neural network; for example by back-propagation of the error.

The method 100 further comprises a step 118 of evaluating the performance of the neural network on a third database B3, called the validation database, comprising annotated images with a tag corresponding to a semantic segmentation mask, in order to determine whether the neural network is sufficiently trained or not.

The validation step 118 can be carried out at each iteration of the training phase 110. Alternatively, in at least one embodiment, the validation step 118 can be carried out at a different frequency, for example every K iterations of the training phase 110.

The validation step 118 measures a performance metric, of the neural network. The performance metric may for example be the performance metric known under the name "mean Intersection over Union", noted mIoU, that is to say an average of the IoU, for "Intersection over Union", obtained for all the images of the validation database B3. The IoU for each image is calculated based on the following relationship:

$$IoU = ZI/ZU$$

where:

ZI: intersection zone, that is the number of pixels in common, between the tag of the validation image and the segmentation prediction provided by the neural network, for each object class; and ZU: union zone, that is the summation of the pixels, the tag of the validation image, and the segmentation prediction provided by the neural network, for each object class.

Next, the average over all of the classes is performed to obtain the mIoU for all the images of the validation database.

For example, it may be considered that the convolutional neural network is sufficiently trained when the performance metric has reached a maximum and has started to decrease. According to at least one embodiment, it may be considered that the neural network is sufficiently trained when the performance metric has reached a level and does not increase during a predetermined number, for example 5, iterations of the training phase 110.

Figure 2:
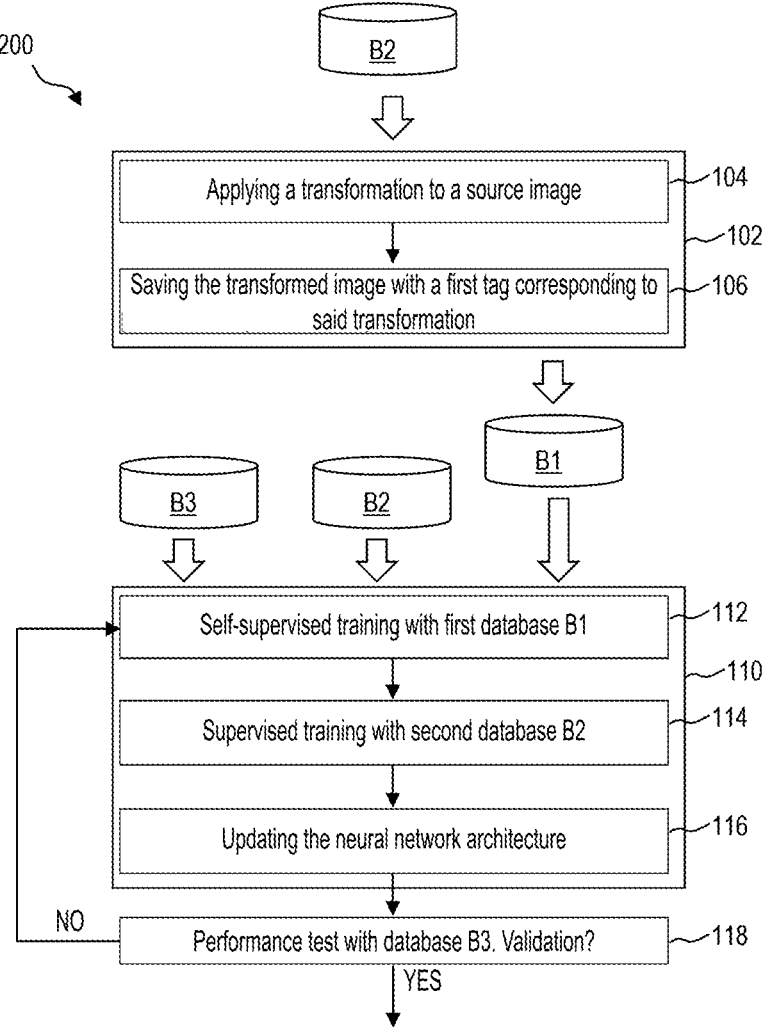
FIG. 2 is a schematic representation of a method according to one or more embodiments of the invention.

FIG. 2 is a schematic representation of a method according to one or more embodiments of the invention for training a deep-learning convolutional neural network for semantic image segmentation.

The method 200 of FIG. 2 comprises all steps of the method 100 of FIG. 1.

The method 200 differs from the method 100 in that the first image database is obtained starting from the second image database. In other words, each first image is obtained by applying a transformation to a second image of the second database.

Each transformed image obtained in step 104 can be stored as the first image in association with the first tag corresponding to the transformation in the first database B1.

Optionally, in at least one embodiment, each transformed image obtained in step 104 can also be stored as a second image in association with the second tag, optionally after adapting the second tag based on the transformation applied to the second image, in the second database B2. Thus, the second database B2 is enriched in parallel with the creation of the first database B1.

Figure 3A:
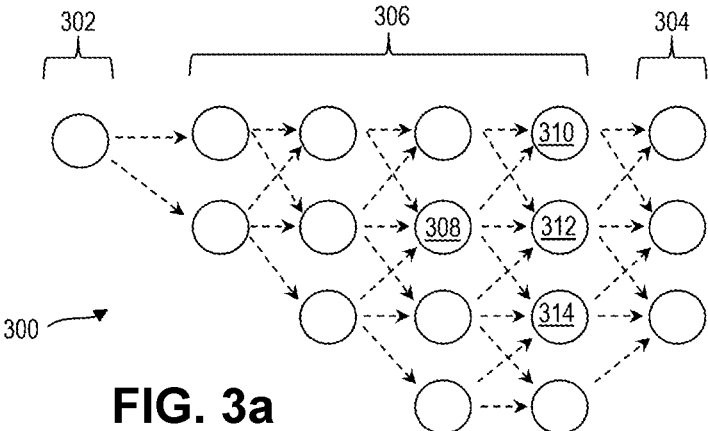
FIGS. 3a and 3b are schematic representations of a dynamic-architecture convolutional neural network according to one or more embodiments of the invention.

FIG. 3a is a schematic representation of a dynamic-architecture convolutional neural network according to one or more embodiments of the invention.

The neural network 300, shown in FIG. 3a, comprises an input layer 302. The input layer 302 may comprise one or more neurons. In the example shown, the input layer comprises a single neuron.

The neural network 300 comprises a decoding layer 306, also called the output layer. In the example shown, the output layer 304 comprises, in a non-limiting manner, three neurons.

The neural network 300 further comprises several encoding layers 306, also called hidden layers, between the input layer 302 and the output layer 304. In the example shown, the neural network comprises four hidden layers. Each hidden layer 306 may comprise a different number of neurons. In the shown example, each hidden layer 306 comprises 2, 3, or 4 neurons in the direction from the input layer 302 to the output layer 304 of the neural network 300.

In the represented neural network 300, a neuron of a layer is connected to a neuron of the following layer, except for the output layer 304. In other words, a neuron of a layer receives the output from one or more neurons of a previous layer, except for the input layer 302. In FIG. 3, all the possible routes between the neurons are represented with dotted arrows.

Thus, for example, there are three possible routes at the output of the neuron 308:

a route to neuron 310, a route to neuron 312, and a route to neuron 314.

Of course, the output of neuron 308 can be directed to one of these routes or any combination of these routes.

The method according to one or more embodiments of the invention makes it possible to determine the architecture of the neural network 300 with a semi-supervised training such as described above, and in particular with reference to FIGS. 1 and 2.

Figure 3B:
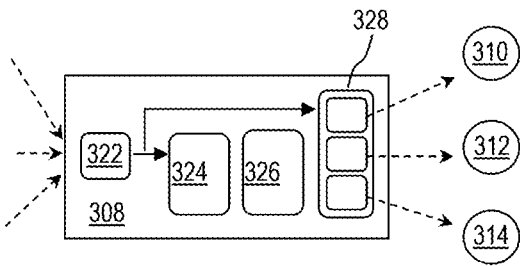

FIG. 3b is a schematic, non-limiting presentation of neuron 308, according to one or more embodiments of the invention.

As shown, neuron 308 can receive as input, potentially the output of several neurons. Neuron 308 optionally comprises an aggregation function 322 of the data received from several neurons of a previous layer. This aggregation function is optional, and is not used, when neuron 308 receives input from the output of a single neuron from a previous layer.

The output of the aggregation function 322, or the input of neuron 308 when the aggregation function 322 is not used, is given as input:

of an activation function 324 for determining whether neuron 308 is active or not, and/or of a processing function 326, for example of a convolution function, that the neuron must apply to the data it receives when it is activated.

In at least one embodiment of the invention, the output of the aggregation function 322, or the input of neuron 308 when the aggregation function 322 is not used, is further given as input of a routing function 328. This routing function 328 makes it possible to determine which of the possible paths at the output of neuron 308 must be used as a function of:

the data that it receives at the input, and at least one routing coefficient determined during the training phase.

It is therefore understood that the architecture of the neural network 300 is dynamic based on the image given at the input and that the output of neuron 308, generally of all the neurons (except the neurons of the output layer) can vary based on the image given as input of the neural network.

Figure 4:
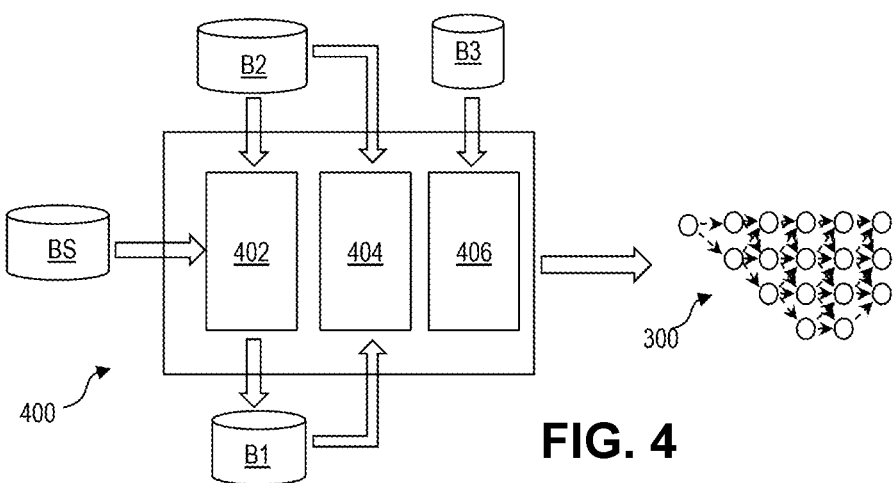
FIG. 4 is a schematic representation of a device according to one or more embodiments of the invention.

FIG. 4 is a schematic representation of a device according to one or more embodiments of the invention.

Device 400 of FIG. 4 may be used to implement a method for training a dynamic-architecture convolutional neural network according to one or more embodiments of the invention, and in particular either of the methods 100 or 200 described above.

Device 400 comprises at least one module 402 for auto-annotation of images of a source database BS, or of the second database B2, in order to obtain an auto-annotated first image database B1. This module is configured to apply a transformation to an image, and to save the transformed image thus obtained with a tag corresponding to said transformation. In particular, the auto-annotation module 404 is configured to implement the auto-annotation phase 102 of the methods 100 and 200 of FIGS. 1 and 2.

Device 400 comprises at least one module 404 for training the dynamic architecture neural network with the image databases B1 and B2. This module is configured to:

perform a self-supervised training step of the neural network with database B1, perform a supervised training step of the neural network with database B2, determine an aggregate error for the two training steps, and update one or more coefficients of the neural network. In particular, training module 404 is configured to implement the training phase 110 of the methods 100 and 200 of FIGS. 1 and 2.

Device 400 comprises at least one module 406 for validating the performance of the neural network with a third database of annotated images B3. This module is configured to test the performance of the neural network on database B3 by measuring a performance metric, such as for example the mIoU metric. In particular, the validation module 406 is configured to implement the validation phase 118 of the methods 100 and 200 of FIGS. 1 and 2.

At least one of the modules 402-406 may be a module independent of the other modules 402-406. At least two of the modules 402-406 may be integrated within the same module.

Each module 402-406 can be a hardware module or a software module, such as an application or a computer program, executed by an electronic component of the processor, electronic chip, or computer type, etc.

It should be noted that a dynamic architecture for a convolutional neural network for semantic image segmentation is known to the person skilled in the art, for example from the document by Yanwei Li et al.: "Learning Dynamic Routing for Semantic Segmentation", accessible here https://arxiv.org/pdf/2003.10401.pdf.

At least one embodiment of the invention makes it possible to train the dynamic-architecture convolutional neural network for semantic image segmentation and to determine the architecture of said neural network, by semi-supervised training so as to make said training less time-consuming and use fewer resources, in particular annotated images.

Of course, at least one embodiment of the invention is not limited to the examples disclosed above. For example, the one or more embodiments of the invention is not limited to the examples of number of neurons, to the examples of the number of transformations, etc., given above.

What is claimed is:

1. A method for training a neural network, comprising a dynamic-architecture convolutional neural network, for semantic image segmentation, said method comprising:

auto-annotation of images, to constitute a first database of auto-annotated images, said auto-annotation of images comprising applying at least one transformation to at least one source image to obtain at least one transformed image, and adding, to each transformed image of said at least one transformed image, a first tag corresponding to said at least one transformation that is applied, wherein the first tag identifies only the at least one transformation that is applied and does not relate to semantic content of the at least one source image;

training of said neural network, said training comprising self-supervised training of said neural network with the first database, providing a self-supervised learning error, wherein the self-supervised learning error is computed based on a predicted transformation corresponding to the first tag, supervised training of said neural network with a second database of images annotated with a second tag relating to semantic image segmentation, providing a supervised learning error, wherein the supervised training is performed based on the second tag and wherein the supervised learning error is computed based on the second tag, and updating at least one parameter of said neural network as a function of the self-supervised learning error and the supervised learning error that are obtained;

wherein said dynamic-architecture convolutional neural network includes routing parameters that control data-dependent propagation of outputs of neurons between layers of the neural network, the self-supervised learning error is computed based on the first tag, and the supervised learning error is computed based on the second tag relating to said semantic image segmentation, and said at least one source image subjected to the auto-annotation belongs to the second database and remains annotated with the second tag and is further associated with the first tag.

2. The method according to claim 1, wherein the self-supervised training and the supervised training are carried out in turn.

3. The method according to claim 1, wherein the training further comprises calculating an aggregate error based on the self-supervised learning error and the supervised learning error that are obtained during the self-supervised training and the supervised training, wherein the updating is carried out as a function of said aggregate error.

4. The method according to claim 1, wherein the auto-annotation of images applies several transformations to said at least one source image to obtain several transformed images from said at least one source image, wherein each transformed image of said several transformed images comprising a tag corresponding to a transformation of said several transformations.

5. The method according to claim 1, wherein said at least one transformation applied to said at least one source image is a rotation of the at least one source image by a predetermined angle.

6. The method according to claim 1, wherein the at least one source image is an image of the second database of images, such that each image of said at least one source image that is transformed comprises

13

14 the first tag added to said each image during the auto-annotation of said images; and the second tag of said at least one source image.

7. The method according to claim 1, wherein, for at least one annotated image of the second database, the second tag is a segmentation mask.

8. The method according to claim 1, wherein the updating carries out an updating of a routing coefficient or of a routing function, of an output of at least one neuron of a layer of the neural network.

9. The method according to claim 1, wherein the updating performs an update of at least one activation coefficient of at least one neuron of the neural network.

10. The method according to claim 1, wherein the updating performs an update of at least one coefficient of a neuron of the neural network.

11. The method according to claim 1, further comprising evaluating a performance of the neural network on a validation database comprising annotated images, in order to determine whether said neural network is sufficiently trained or not.

12. The method according to claim 11, wherein the performance of the neural network is measured by a Mean Intersection over Union (mIoU) validation metric.

13. A non-transitory computer-readable medium comprising executable instructions, which, when executed by a computer device, implement a method for training a neural network, comprising a dynamic-architecture convolutional neural network, for semantic image segmentation, said method comprising:

auto-annotation of images, to constitute a first database of auto-annotated images, said auto-annotation of images comprising applying at least one transformation to at least one source image to obtain at least one transformed image, and adding, to each transformed image of said at least one transformed image, a first tag corresponding to said at least one transformation that is applied, wherein the first tag identifies only the at least one transformation that is applied and does not relate to semantic content of the at least one source image;

training of said neural network, said training comprising self-supervised training of said neural network with the first database, providing a self-supervised learning error, wherein the self-supervised learning error is computed based on a predicted transformation corresponding to the first tag, supervised training of said neural network with a second database of images annotated with a second tag relating to semantic image segmentation, providing a supervised learning error, wherein the supervised training is performed based on the second tag and wherein the supervised learning error is computed based on the second tag, and updating at least one parameter of said neural network as a function of the self-supervised learning error and the supervised learning error that are obtained;

wherein said dynamic-architecture convolutional neural network includes routing parameters that control data-dependent propagation of outputs of neurons between layers of the neural network, the self-supervised learning error is computed based on the first tag, and the supervised learning error is computed based on the second tag relating to said semantic image segmentation, and said at least one source image subjected to the auto-annotation belongs to the second database and remains annotated with the second tag and is further associated with the first tag.

14. A training device comprising means configured to implement a method for training a neural network, comprising a dynamic-architecture convolutional neural network, for semantic image segmentation, said training device comprising:

a computing means for auto-annotation of images, to constitute a first database of auto-annotated images, said auto-annotation of images comprising applying at least one transformation to at least one source image to obtain at least one transformed image, and adding, to each transformed image of said at least one transformed image, a first tag corresponding to said at least one transformation that is applied;

training of said neural network, said training comprising self-supervised training of said neural network with the first database, providing a self-supervised learning error, wherein the self-supervised learning error is computed based on a predicted transformation corresponding to the first tag, supervised training of said neural network with a second database of images annotated with a second tag relating to semantic image segmentation, providing a supervised learning error, wherein the supervised training is performed based on the second tag and wherein the supervised learning error is computed based on the second tag, and updating at least one parameter of said neural network as a function of the self-supervised learning error and the supervised learning error that are obtained;

wherein said dynamic-architecture convolutional neural network includes routing parameters that control data-dependent propagation of outputs of neurons between layers of the neural network, the self-supervised learning error is computed based on the first tag, and the supervised learning error is computed based on the second tag relating to said semantic image segmentation, and said at least one source image subjected to the auto-annotation belongs to the second database and remains annotated with the second tag and is further associated with the first tag.

15. The training device of claim 14, further comprising a deep dynamic-architecture neural network for semantic image segmentation obtained from said method via said computing means.

\* \* \* \* \*